(12) United States Patent
Driver

(10) Patent No.: US 7,261,788 B1
(45) Date of Patent: *Aug. 28, 2007

(54) PREPARATION OF CURED IN PLACE LINER WITH INTEGRAL INNER IMPERMEABLE LAYER

(75) Inventor: Franklin Thomas Driver, St. Charles, MO (US)

(73) Assignee: Insitaform (Netherlands) B.V., Rotterdam (NL)

( * ) Notice: Subject to any disclaimer, the term of this patent is extended or adjusted under 35 U.S.C. 154(b) by 872 days.

This patent is subject to a terminal disclaimer.

(21) Appl. No.: 10/703,814

(22) Filed: Nov. 7, 2003

(51) Int. Cl.
B29C 53/48 (2006.01)
B29C 63/34 (2006.01)

(52) U.S. Cl. .................. 156/203; 138/97
(58) Field of Classification Search .............. None
See application file for complete search history.

(56) References Cited

U.S. PATENT DOCUMENTS

| | | |
|---|---|---|
| 3,533,133 A | 10/1970 | Meitinger |
| 3,737,261 A | 6/1973 | Hardesty |
| 4,009,063 A | 2/1977 | Wood |
| 4,064,211 A | 12/1977 | Wood |
| 4,135,958 A | 1/1979 | Wood |
| 4,182,262 A | 1/1980 | Everson et al. |
| 4,366,012 A | 12/1982 | Wood |
| 4,446,181 A | 5/1984 | Wood |
| 4,456,401 A | 6/1984 | Williams et al. |
| 4,714,095 A | 12/1987 | Muller et al. |
| 4,786,345 A | 11/1988 | Wood et al. |
| 5,285,741 A | 2/1994 | Askin |
| 5,323,723 A | 6/1994 | Askin |
| 5,653,555 A | 8/1997 | Catallo |
| 5,778,938 A | 7/1998 | Chick et al. |
| 6,254,709 B1 * | 7/2001 | Kamiyama et al. ........... 156/91 |
| 6,270,259 B1 | 8/2001 | Burton |

(Continued)

FOREIGN PATENT DOCUMENTS

DE 4113002 A1 10/1992

(Continued)

OTHER PUBLICATIONS

International Search Report (PCT/US2004/036625).

(Continued)

*Primary Examiner*—Jessica Ward
(74) *Attorney, Agent, or Firm*—Greenberg Traurig, LLP; Michael I. Wolfson

(57) ABSTRACT

A resin impregnated cured in place liner with an integral inner impermeable layer, a method for its manufacture and an apparatus to do this are provided. The liner is formed from a resin impregnable material having an impermeable layer bonded to one surface. The material is formed into tubular shape with the impermeable layer on the outside of the tube about a tubular forming member and continuously everted into the tubular forming device to place the impermeable layer on the inside. An outer impermeable film is placed about the inner tubular layer and may be impregnated with vacuum in the usual manner. Alternatively, the tubular resin impregnable material may be passed through a resin tank and impregnated with a curable resin prior to being wrapped with an outer impermeable layer. The impregnated liner is then suitable for pull-in-and-inflate which can be by steam in view of the integral inner impermeable layer of the liner.

17 Claims, 4 Drawing Sheets

U.S. PATENT DOCUMENTS

| | | |
|---|---|---|
| 6,270,289 B1 | 8/2001 | Einhaus et al. |
| 6,270,599 B1 | 8/2001 | Wood |
| 6,539,979 B1 | 4/2003 | Driver |
| 6,612,340 B1 | 9/2003 | Lause |
| 2003/0015247 A1 | 1/2003 | Driver et al. |
| 2003/0113489 A1 | 6/2003 | Smith |

FOREIGN PATENT DOCUMENTS

| | | |
|---|---|---|
| EP | 0 403 133 A | 12/1990 |
| EP | 0 542 639 A | 5/1993 |
| GB | 1601234 | 10/1981 |
| RU | 2097196 C1 | 11/1997 |
| WO | WO90/11175 A | 10/1990 |
| WO | WO91/18234 A | 11/1991 |
| WO | WO98/31964 A | 7/1998 |
| WO | WO 01/77569 A | 10/2001 |
| WO | WO 02/064351 A | 8/2002 |
| WO | WO 03/038331 A | 5/2003 |
| WO | WO 03/069211 A | 8/2003 |

OTHER PUBLICATIONS

International Search Report (PCT/US2004/036633).
International Search Report (PCT/US2004/036629).
International Search Report (PCT/US2004/036621).
International Search Report (PCT/US2004/036628).

* cited by examiner

PREPARATION OF CURED IN PLACE LINER WITH INTEGRAL INNER IMPERMEABLE LAYER

BACKGROUND OF THE INVENTION

This invention relates to cured in place liners for trenchless rehabilitation of existing conduits and pipelines, and more particularly to a cured in place liner of a resin impregnable material with an integral inner impermeable layer continuously manufactured in desired lengths for trenchless rehabilitation of existing conduits by pulling in and inflating.

It is generally well known that existing conduits and pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipelines. Alternatively, the leakage may be outward from the conducting portion of the pipeline into the surrounding environment. In either case of infiltration or exfultration, it is desirable to avoid this type of leakage.

The leakage in the existing conduit may be due to improper installation of the original pipeline, or deterioration of the pipe itself due to normal aging, or the effects of conveying corrosive or abrasive material. Cracks at, or near pipe joints may be due to environment conditions such as earthquakes, or the movement of large vehicles on the overhead surface, or similar natural or man-made vibrations, or other such causes. Regardless of the cause, such leakages are undesirable and may result in waste of the fluid being conveyed within the pipeline, or result in damage to the surrounding environment and possible creation of dangerous public health hazards. If the leakage continues it can lead to structural failure of the existing conduit due to loss of soil and side support of the conduit.

Because of ever increasing labor and machinery costs, it is increasingly more difficult and less economical to repair underground pipes or portions that may be leaking by digging up the existing pipe and replacing the pipe with a new one. As a result, various methods have been devised for the in place repair or rehabilitation of existing pipelines. These new methods avoid the expense and hazards associated with digging up and replacing the pipe or pipe sections, as well as the significant inconvenience to the public during construction. One of the most successful pipeline repair or trenchless rehabilitation processes that is currently in wide use is called the Insituform® Process. The Insituform Process is described in detail in U.S. Pat. No. 4,009,063, U.S. Pat. No. 4,064,211 and U.S. Pat. No. 4,135,958, the contents of which are all incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. In the most widely practiced embodiment of that process, the liner is installed utilizing an eversion process, as described in the '211 and '958 Insituform patents. In the eversion process, radial pressure applied to the interior of an everted liner presses it against and into engagement with the inner surface of the pipeline as the liner unfolds along the length of the pipeline. The Insituform Process is also practiced by pulling a resin impregnated liner into the conduit by a rope or cable and using a separate fluid impermeable inflation bladder or tube that is everted within the liner to cause the liner to cure against the inner wall of the existing pipeline. Such resin impregnated liners are generally referred to as "cured-in-place-pipes" or "CIPP liners" and the installation is referred to a CIPP installation.

Conventional cured in place flexible tubular liners for both the eversion and pull-in-and-inflate CIPP installations have an outer smooth layer of relatively flexible, substantially impermeable polymer coating in its initial state. The outer coating allows a resin to be impregnated into the inner layer of resin impregnable material, such as felt. When everted, this impermeable layer ends up on the inside of the liner with the resin impregnated layer against the wall of the existing pipeline. As the flexible liner is installed in place within the pipeline, the pipeline is pressurized from within, preferably utilizing an eversion fluid, such as water or air to force the liner radially outwardly to engage and conform to the interior surface of the existing pipeline. Cure of the resin is initiated by introduction of hot curing fluid, such as water into the everted liner through a recirculation hose attached to the end of the everting liner. The resin impregnated into the impregnable material then cures to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When tubular cured in place liners are installed by the pull-in-and-inflate method, the liner is impregnated with resin in the same manner as in the eversion process and pulled into and positioned within the existing pipeline in a collapsed state. In a typical installation, a downtube, inflation pipe or conduit having an elbow at the lower end is positioned within an existing manhole or access point and an everting bladder is passed through the downtube, opened up and cuffed back over the mouth of the horizontal portion of the elbow and inserted into the collapsed liner. The collapsed liner within the existing conduit is then positioned over and secured to the cuffed back end of the inflation bladder. An everting fluid, such as water, is then fed into the downtube and the water pressure causes the inflation bladder to push out of the horizontal portion of the elbow and cause the collapsed liner to expand against the interior surface of the existing conduit. The eversion of the inflation bladder continues until the bladder reaches and extends into the downstream manhole or second access point. At this time the liner pressed against the interior surface of the existing conduit is allow to cure. Cure is initiated by introduction of hot curing water introduced into the inflation bladder in much the same manner as the recirculation line tied to the end of the everting bladder to cause the resin in the impregnated layer to cure.

After the resin in the liner cures, the inflation bladder may be removed or left in place in the cured liner. Both the pull-in and inflate method as well as the eversion method typically require man-access to restricted manhole space on several occasions during the process. For example, man-access is required to secure the everting liner or bladder to the end of the elbow and insert it into the collapsed liner.

Regardless of how the liner is to be installed a curable thermosetting resin is impregnated into the resin absorbent layers of a liner by a process referred to as "wet out." The wet-out process generally involves injecting resin into resin absorbent layers through an end or an opening formed in the outer impermeable film, drawing a vacuum and passing the impregnated liner through nip rollers as is well known in the lining art. A wide variety of resins may be used, such as polyester, vinyl esters, epoxy resins and the like, which may be modified as desired. It is preferable to utilize a resin which is relatively stable at room temperature, but which cures readily when heated with air, steam or hot water, or subjected to appropriate radiations such as ultra-violet light.

One such procedure for wetting out a liner by vacuum impregnation is described in Insituform U.S. Pat. No. 4,366,012. When the liner has inner and outer impermeable layers, the tubular liner may be supplied flat and slits formed on opposite sides of the flattened liner and resin injected and on both sides as described in the '063 patent. Another apparatus for wetting out at the time of installation while drawing a vacuum at the trailing end of the liner is shown in U.S. Pat. No. 4,182,262. The contents of each of these patents are incorporated herein by reference.

Recent efforts have been made to modify the pull-in and inflate method to utilize air to evert a bladder into the pulled-in liner from a proximal access point. When the everting bladder reaches the distal access point, steam is introduced into the proximal access point to initiate cure of the resin impregnated into the resin impregnable layer. This process offers the advantage of faster cure due to the increased energy carried by the steam as the curing fluid. However, the process still requires eversion of a bladder into the pulled-in impregnated liner. Efforts to avoid this step of everting the bladder into the pulled-in liner include performing the eversion step above ground. For example, in U.S. Pat. No. 6,270,289, the process includes everting a calibration hose into a flat-lying lining hose above ground prior to pulling the hose assembly into the existing conduit. This process avoids the eversion below grade, but is severely limited into the length of lining that can be laid out above ground prior to pulling-in.

A further suggestion to avoid this eversion is to manufacture a liner having an inner coating and an outer coating so that a curing fluid can be introduced directly into a pulled-in liner. The disadvantages here involves the difficulty faced when trying to impregnate the resin impregnable material disposed between the inner and outer impermeable coatings. The outer coating remains essential for handling the impregnated liner and to allow the liner to be pulled into the existing conduit and the inner coating is desired to all for curing with the steam.

Notwithstanding the modifications to both the eversion and pull-in and inflate trenchless rehabilitation methods, both processes are labor intensive, require an eversion step and suffer from the increased costs associated with this. Accordingly, it is desirable to provide a rehabilitation method utilizing pull-in and inflate methodology wherein the liner is manufactured with an inner and outer coatings and readily impregnated so that it can be cured by steam as the curing fluid to take advantage of the energy available to provide an installation method which is faster and more efficient economically than current rehabilitation methods.

SUMMARY OF THE INVENTION

Generally speaking, in accordance with the invention, a resin impregnated cured in place liner with an integral inner impermeable layer suitable for pull-in and inflate rehabilitation of existing pipelines is provided. The liner is continuously formed from a length of resin absorbent material having bonded thereto on one surface an impermeable layer formed into a tubular shape and sealed into a tube with the impermeable layer on the inside of the tube. The resin absorbent tube with the inner impermeable layer may be wrapped with additional layers of resin absorbent material secured into tubular form. An impermeable film is wrapped about the inner resin impregnable tube. The resin absorbent material may be impregnated with a thermosetting resin before or after the outer resin impermeable film is wrapped about the inner tube.

The inner impermeable layer should be one which is resistant to the high temperatures of the curing fluid and exposure to fluids intended to be carried with in the rehabilitated pipe. The outer layer may be simply heat sealed using a thermal bond or taped. This outer seal merely encapsulates the resin impregnated material but should have sufficient strength to withstand handling and abrasion as the liner is transported and then pulled into the existing conduit.

The resin absorbent material with the integral impermeable layer on one surface can be formed into a tube and sealed in a variety of ways. This includes conventional heat bonding and taping, sewing and taping, or sealing with an extruded material. The tube is continuously formed with the resin impregnable layer on the inside about a tubular device in one direction with the impermeable layer on the outside, sealed in a conventional manner and then everted continuously through the forming device. The outer layer is now the resin absorbent layer or layers that are impregnated prior to or after being wrapped with a polymeric coating to contain the resin and allow for storage and pulling the liner with inner and outer impermeable layers into the existing conduit.

Accordingly, it is an object of the invention to provide an improved method of cured-in-place rehabilitation of existing pipelines.

Another object of the invention is to provide an improved liner for cured in place rehabilitation of an existing pipeline.

A further object of the invention is to provide an improved liner having an integral inner impermeable layer suitable for trenchless rehabilitation of existing pipelines.

Yet another object of the invention is provide an improved method of continuously manufacturing a resin impregnated cured in place liner having an integral inner impermeable layer.

Yet a further object of the invention is to provide a method of manufacturing a resin impregnated cured in place liner having an integral inner impermeable layers and an outer impermeable coating for pull-in and inflate trenchless pipeline installation.

Still other objects and advantages of the invention will in part be obvious and will in part be apparent from the specification.

The invention accordingly comprises the several steps and the relation of one or more of such steps with respect to each of the others, the apparatuses embodying features of construction, combinations and arrangement of parts that are adapted to effect such steps, and the products that possess the characteristics, features, properties, and the relation of components, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing(s), in which.

DESCRIPTION OF THE PREFERRED EMBODIMENTS

A resin impregnated cured in place liner prepared in accordance with the invention has an integral internal lining so that it can be installed by the pull-in-and-inflate method and inflated and cured with a heated fluid without the use of an inflation bladder. The impregnated liner with inner impermeable polymer layer is prepared continuously in desired lengths. The liner may be impregnated as it is assembled in view of the increased effort necessary to impregnate a flattened liner having a resin absorbent material between an inner and an outer coating using convention vacuum impregnation technology.

This increased effort necessary is evidenced by the process suggested in U.S. Pat. No. 6,270,289. Here, above ground a calibration hose is inverted into a flat-lying impregnated lining hose, or an impregnated lining hose is inverted into a tubular film using compressed air. In this case, the length of the lining hose approximates the length of the underground conduit to be lined. The inversion of one tube inside the other requires an unobstructed length equal to the length of the longest layer. If the two layers had not been previously impregnated, it would be necessary to inject resin between the layers on both sides of the lay flat tubes in order to provide adequate impregnation. This is a difficult and inefficient way to impregnate lining tubes. Thus, not only is the length restricted, but also the impregnation is extremely difficult.

Figure 1:
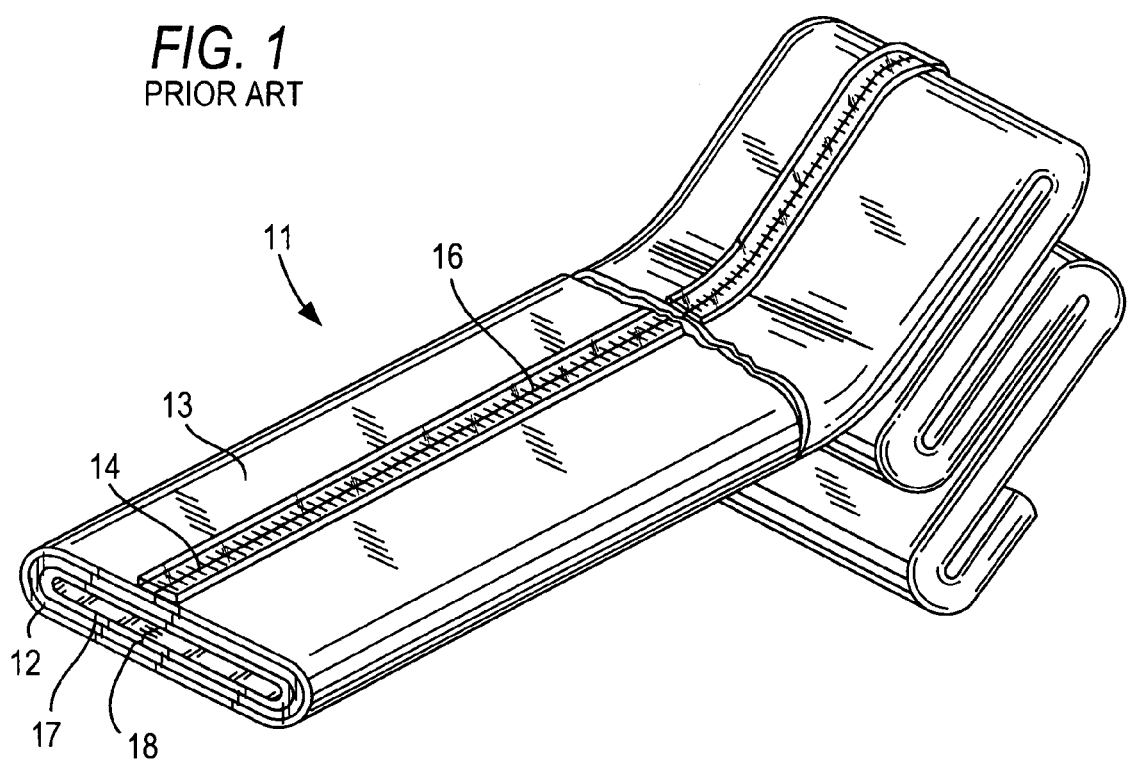
FIG. 1 is a perspective view of a length of a typical resin impregnable cured in place liner suitable for use in lining an existing pipeline of the type generally in use today and well known in the art.

FIG. 1 illustrates a flexible cured in place liner 11 of the type generally in use today and well known in the art. Liner 11 is formed from at least one layer of a flexible resin impregnable material, such as a felt layer 12 having an outer impermeable polymer film layer 13. Felt layer 12 and outer polymer layer 13 are stitched along a seam line 14 to form a tubular liner. A compatible thermoplastic film in a form of a tape or extruded material 16 is placed on or extruded over seam line 14 in order to ensure the impermeability of liner 11. In the embodiment illustrated in FIG. 1 and used throughout this description, liner 11 includes an inner tube of a second felt layer 17 also stitched along a seam line 18 positioned at a point in the tube other than the location of seam line 14 in outer felt layer 12. Outer felt layer 12 with polymer layer 13 is then formed around inner tubular layer 17. After impregnation liner 11 in a continuous length is stored in a refrigeration unit to suppress premature cure of the resin. Liner 11 is then cut to a desired length after being pulled into the existing pipeline, or is cut prior to being everted into the existing pipeline.

Liner 11 of the type illustrated in FIG. 1 is impermeable to water and air. This will allow use in an air or water eversion as described above. However, in a pull in and inflate installation in accordance with the invention, the outer coating on the liner need only be sufficiently impermeable to allow for suitable wet out and retention of resin and to prevent damage to the liner as it is pulled into the existing pipeline.

For larger liner diameters, several layers of felt or resin impregnable material may be used. Felt layers 12 and 17 may be natural or synthetic flexible resin absorbable material, such as polyester, acrylic polypropylene, or inorganic fibers such as glass and carbon. Alternatively, the resin absorbent material may be a foam. Impermeable film 13 in outer impermeable layer 12 may be a polyolefin, such as polyethylene or polypropylene, a vinyl polymer, such as polyvinyl chloride, or a polyurethane as is well known in the art. Any form of sewing, adhesive bonding or flame bonding, or any other convenient means can be used to join the material into tubes. In the initial step in all trenchless rehabilitation installations, the existing pipeline is prepared by cleaning and videotaping.

Figure 2:
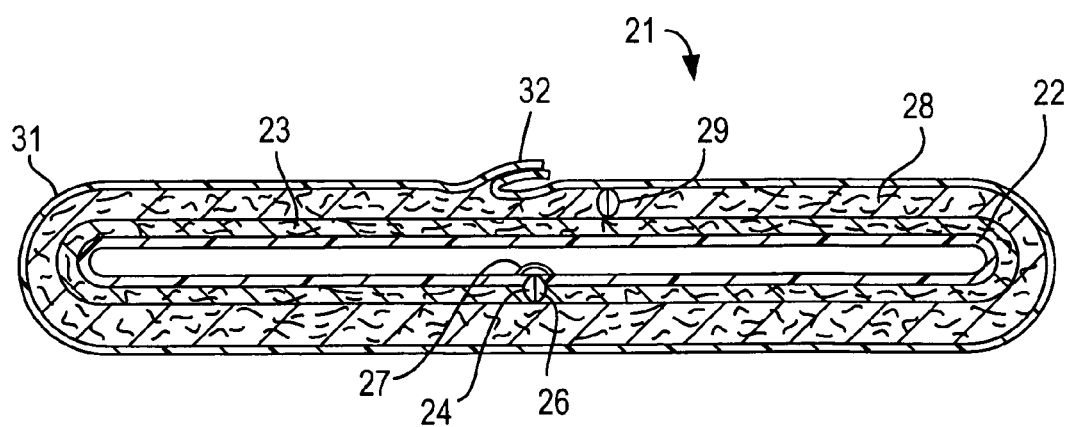
FIG. 2 is a cross-section view of a cured in place liner having an integral inner impermeable layer and an outer impermeable film or wrapping constructed and arranged in accordance with the invention.

Referring now to FIG. 2, a cured in place liner 21 prepared in accordance with the invention is shown in cross-section. Liner 21 is constructed in similar fashion to convention liner 11, but includes an inner tubular member with an integral inner impermeable layer 22 that has a thin felt or resin impregnable layer 23 bonded thereto. Inner felt layer 23 with impermeable layer 22 has been sewn along abutting longitudinal edges to form a seam line 24 by a row of stitches 26 and sealed with a tape 27 applied over stitches 26. An outer felt layer 28 is wrapped about inner thin felt layer 23 and formed into a tube by stitches 29. Finally, an outer layer or wrapping 31 is disposed about outer-felt layer 28.

By providing a liner having both inner and outer impermeable layers, it is not necessary to evert the liner during installation or evert an inflation bladder after the liner has been pulled into the existing conduit. Thus, significant saving in labor cost at the time of installation are available. It also allows for use of a heated curing fluid such as steam to inflate and cure the resin. In such case all the heated fluids are introduced into the liner below ground level to provide a safer work environment.

Figure 7:
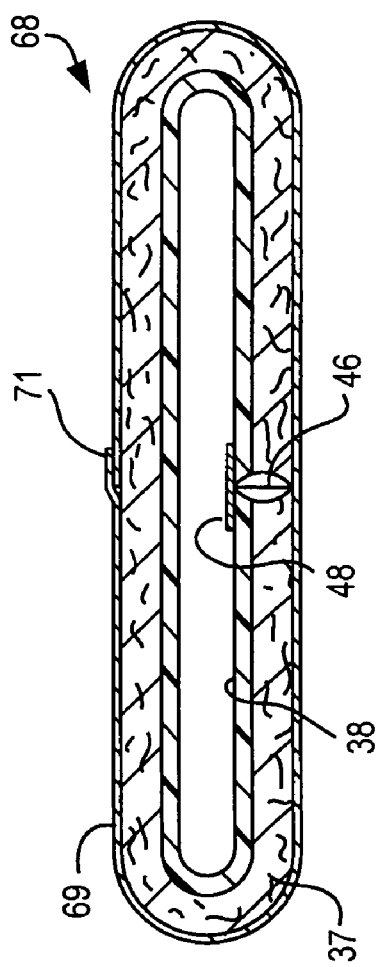
FIG. 7 is a cross-section of the liner prepared by the apparatus of FIGS. 3 and 5.

Felt layers 23 and 28 may be impregnated in the usual manner using vacuum. Alternatively, felt layers 23 and 28 are first impregnated with resin and then an outer impermeable wrapping 31 is applied. This avoids the difficulty with impregnating a finished liner having felt layers between an inner and outer impregnable layer. In U.S. Pat. No. 4,009,063, Eric Wood proposed injecting resin in the felt layer using needles inserted into opposite sides of a flattened constructed liner. This operation requires cutting and patching needle holes in the outer coating. The vacuum impregnation process taught in U.S. Pat. No. 4,366,012 would not be suitable unless the vacuum is drawn on both sides as the inner coating is a barrier to resin flow in a liner with inner and outer coating. In order to overcome these impregnation difficulties, liner 21 is manufactured from endless rolls of flat coated and plain felt and continuously impregnated prior to application of outer wrapping 31. This is accomplished by the method illustrated in FIGS. 3 and 5 resulting in a liner 68 as illustrated in FIG. 7.

While felt layers 23 and 28 are formed into tubes by stitching and/or taping, any of the conventionally known methods for forming felt or other resin impregnable material into tubes is suitable. For example, tubes can be formed by use of various glues or adhesives as well as flame bonding. Tape may be applied to inner felt layer 23 and inner impermeable layer 22 by applying an adhesive strip, extruding a layer of polymeric material, or heat fusing the tape in order to seal the butted edges of the felt material and the holes formed during a sewing operation.

Figure 3:
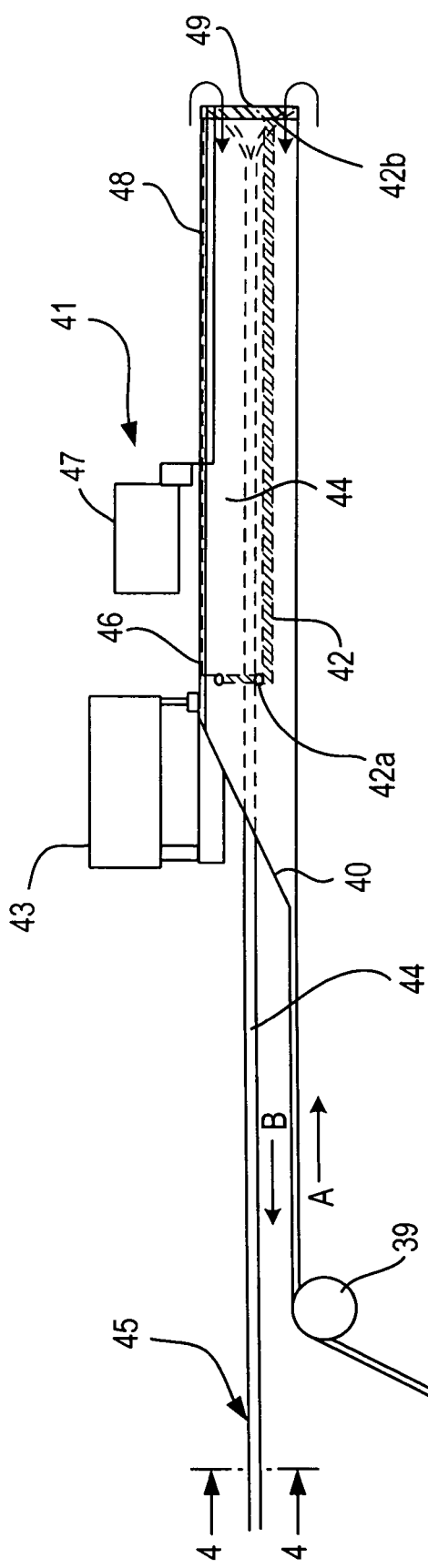
FIG. 3 is a schematic view of the apparatus used for preparing the inner portion of the liner having an outer felt layer with an integral inner high temperature polymeric layer used in connection with preparation of the cured in place liner of FIG. 2.

Referring now to FIG. 3, a method for continuously forming a length of a tube of resin impregnable material with a sealed inner layer of impermeable material is shown. A roll of coated felt 36 having an endless length of felt 37 with an impermeable layer 38 bonded to one surface is fed over a directional roller 39 in flat form with coated side facing roller 39 to a tube-forming device 41.

Tube forming device 41 includes a tubular support frame 42 having a proximal end 42a and a distal end 42b and a film deformer 40. A seaming device 43 that may be a sewing and taping machine, gluing machine or flame bonding apparatus is mounted above support frame 42. Felt 37 with impermeable layer 38 facing roller 39 is fed in the direction of an arrow A to the proximal end of tube forming device 41 where it is deflected by deflector 40 and wrapped around support frame 42 and seamed into a tube 44 along a seam line 46 with felt 37 on the inside and impermeable layer 38 on the outside. Tube 44 then passes a taping device 47 where a tape 48 is placed over seam line 46 to form an impermeable coated taped tube member 45.

Figure 4:
FIG. 4 is a cross-sectional view showing the structure of the inner tubular portion of the liner produced by the apparatus of FIG. 3.

Taped tube member 45 then continues to travel along tubular support frame 42 to an inverter ring 49 at the distal end 42b of support frame 42. Taped tube member 45 is then everted into tubular support frame 42 so that impermeable layer 38 is now on the inside of tube 45 as it is withdrawn from the proximal end 42a of tubular support frame 42 along a line defined by an arrow B. At this point everted tube 45 has the structure illustrated in cross-section in FIG. 4 with impermeable layer 38 on the inside of tube 45 and felt layer 37 on the outside. Tube 45 then continues to travel in the direction of arrow B for the addition of one or more plain felt layers. Tube 45 is then stored for further use, wrapped with an outer impermeable coating, or may be passed directly to a resin impregnation step as shown on FIG. 5 prior to final wrapping.

Figure 5:
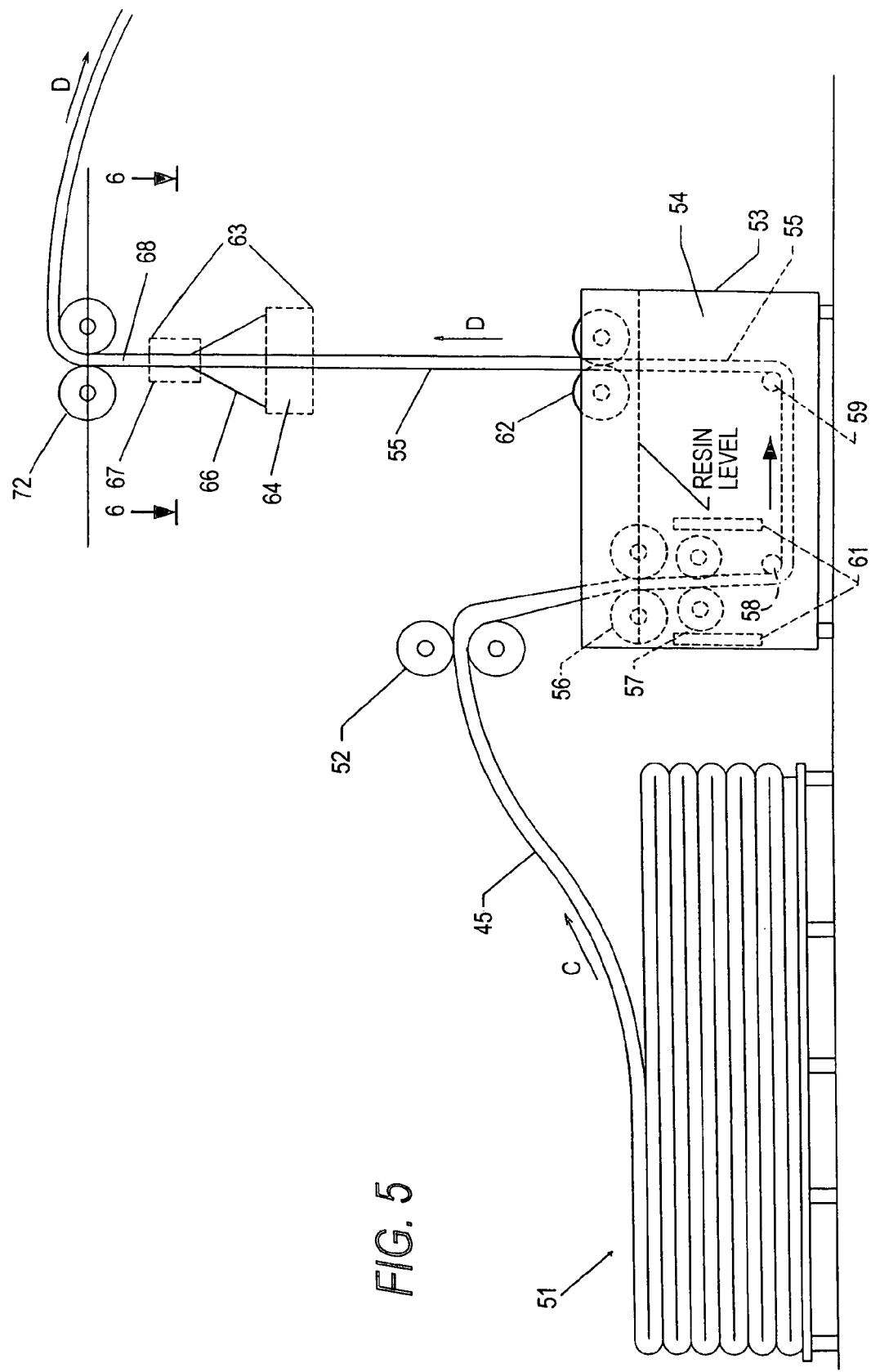
FIG. 5 is a schematic in elevation showing resin impregnation and wrapping of the tubular member of FIG. 4 for preparing an impregnated CIPP liner having inner and outer impermeable layers in accordance with the invention.

FIG. 5 illustrates in schematic impregnation of a supply 51 of taped tube 45. Here, tube 45 is pulled in arrow direction C by or through a pair of rubber covered pulling rollers 52 into an open top resin tank 53 filled to a predetermined level with a curable thermoset resin 54 to form an impregnated or wet out tube 55. Tube 45 passes between a first and second set of compression rollers 56 and 57 and around a first directional roller 58 to turn tube 45 in a horizontal direction and a second directional roller 59 to turn tube to a vertical direction. A sonic wave generator 61 may be utilized in lieu of or in addition to second compression rollers 57. Sonic wave generator 61 improves the impregnation of resin 54 into felt layer 37 of tube 45 as it passes through resin tank 53. After changing direction about second directional roller 59, impregnated tube 55 passes between a pair of pneumatic calibration rollers 62. At this time, tube 55 then enters through a film wrapping and sealing station 63.

Wrapping and sealing station 63 includes a roll 64 of a resin impregnable film material 66 that is wrapped about moving impregnated tube 55 as it passes into a film edge sealer device 67. Resin impregnated tube 55 is now a wrapped tube 68 having an impermeable outer wrapping 69 with an edge seal 71 as it exits film edge sealer 67 as shown in cross-section in FIG. 7. Wrapped tube 68 is pulled by a pair of final pulling rollers 72 and fed along an arrow D as shown in FIG. 5 to a refrigerated truck for shipment to an installation site.

Figure 6:
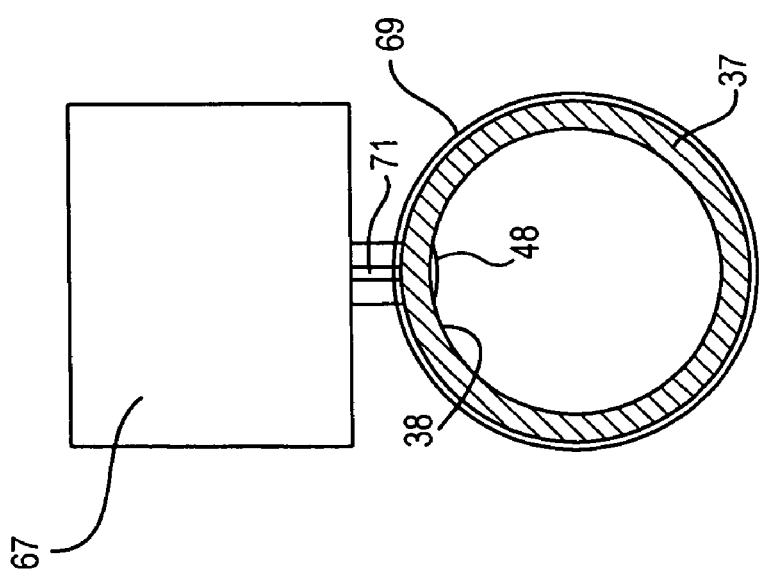
FIG. 6 is a cross-sectional view of the edge sealing device of the wrapping apparatus of FIG. 5 taken along line 6-6.

FIG. 6 is a cross-sectional view of edge sealing device 63 showing film 66 formed into a sealed tube 69 of impermeable film 66 with a sealed edge 71.

FIG. 7 is a cross-sectional view of the finished wrapped tube 68 with impregnable layer 37 and integral inner impermeable layer 38 bonded thereto and outer wrapping 69. As noted in connection with liner 21 in FIG. 2, there may be more than one layer of resin impregnable, depending on the diameter or engineering requirements of the installation.

Once at the installation site, impregnated tube 68 having inner impermeable layer 38 and outer impermeable wrapping 69 is ready for installation by the pull-in-and-inflate method. This method is fully described in U.S. Pat. No. 4,009,063, the contents of which are incorporated herein by reference. In the case of installation by the pull-in-and-inflate method, a separate eversion bladder is not necessary to inflate the liner due to the presence of integral inner impermeable layer 38. By proper selection of materials for integral inner impermeable layer 38, such as polypropylene, inflation and curing can be done with steam introduced into the liner 68 once in position in the existing conduit.

The processes and apparatuses described herein provide a convenient means to prepare a cured in place liner having an inner impermeable layer and an outer impermeable film. A tube forming and eversion apparatus as illustrated in FIG. 3 readily provides a method to prepare the inner portion of the finished tube with a sealed impermeable layer on the inside of the tube and an outer felt or resin impregnable layer. Additional layers of uncoated felt may be wrapped about the formed inner tube if desired.

The tube prepared in accordance with the process described in connection with FIG. 3 is then readily impregnated in an open top resin tank and wrapped with an impermeable wrapping as described in connection with the apparatus shown in FIG. 5. Use of an open resin tank and compression rollers avoids the need to impregnate utilizing high pressure techniques which are cumbersome to use in view of the desire to impregnate in a continuous fashion. Alternatively, if the liner is wrapped prior to resin impregnation, the liner can be wet out by vacuum in the usual manner as noted above.

It will thus be seen that the objects set forth above, among those made apparent from the preceding description, are efficiently attained and, since certain changes may be made in carrying out the above process, in the described product, and in the construction(s) set forth without departing from the spirit and scope of the invention, it is intended that all matter contained in the above description and shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of continuously preparing a length of a cured in place liner having an integral inner impermeable layer and at least one outer layer of resin impregnable material, comprising:

providing a length of a resin impregnable material having an impermeable layer bonded to one surface;

feeding the length of resin impregnable material in a first direction and forming the length of material into tubular form having the impermeable layer on the outside;

joining the longitudinal edges of the length of resin impregnable material together to form a tubular member;

sealing the joined longitudinal edges of the tubular member;

everting the tubular member into itself in a second opposite direction so that the outer layer is the resin impregnable material; and continuously removing the tubular member with the integral impermeable layer on the inside.

2. The method of claim 1, wherein the first length of resin impregnable material is formed into a tubular member by stitching the longitudinal edges of the resin impregnable material and impermeable layer.

3. The method of claim 2, wherein the stitches are sealed by applying a tape of impermeable material over the longitudinal edges.

4. The method of claim 1, including the step of:
providing a supply of a substantially planar impermeable film;
placing the impermeable film about the tubular member; and
sealing the impermeable film into a tubular wrapping about the first tubular member.

5. The method of claim 4, wherein the outer impermeable film is sealed by heat and pressure with an edge sealer.

6. The method of claim 4, including the step of impregnating the tubular member before wrapping with the impermeable film.

7. The method of claim 6, including the step of impregnating the resin impregnable material by passing the tubular member through a resin bath to impregnate the resin impregnable material with resin.

8. The method of claim 7, including the steps of:
providing a supply of a substantially planar impermeable film;
wrapping the impregnated tubular member with inner impermeable layer with the impermeable film; and
sealing the impermeable film into a tubular wrapping about the resin impregnable tubular member.

9. The method of claim 6, wherein the impermeable film is fed in the same direction as the inner tubular member exiting the resin bath to wrap the tubular member and seal the impermeable film.

10. The method of claim 9, wherein the outer impermeable film is sealed by heat and pressure with an edge sealer.

11. The method of claim 1, further including the steps of:
providing at least one additional length of resin impregnable material;
feeding the additional resin impregnable material about the tubular member of impregnable material with the impermeable layer on the inside; and
joining the additional resin impregnable material into a tube about the first tubular member with the impermeable layer on the inside.

12. The method of claim 11, including the steps of:
providing a supply of a substantially planar impermeable film;
wrapping the tubular member with inner impermeable layer with the impermeable film; and
sealing the impermeable film into a tubular wrapping about the resin impregnable tubular member.

13. The method of claim 12, wherein the impermeable film is fed in the same direction as the inner tubular member exiting the resin bath to wrap the tubular member and seal the impermeable film.

14. The method of claim 13, wherein the outer impermeable film is sealed by heat and pressure with an edge sealer.

15. The method of claim 12, including the step of impregnating the tubular member before wrapping with the impermeable film.

16. The method of claim 15, including the step of impregnating the resin impregnable material by passing the tubular member through a resin bath to impregnate the resin impregnable material with resin.

17. The method of claim 16, wherein the impermeable film is fed in the same direction as the inner tubular member existing the resin bath to wrap the impregnated tubular member and seal the impermeable film.

* * * * *

UNITED STATES PATENT AND TRADEMARK OFFICE
CERTIFICATE OF CORRECTION

PATENT NO. : 7,261,788 B1
APPLICATION NO. : 10/703814
DATED : August 28, 2007
INVENTOR(S) : Franklin Thomas Driver Page 1 of 1

It is certified that error appears in the above-identified patent and that said Letters Patent is hereby corrected as shown below:

On Title Page

Item:

"(73) Assignee: Insitaform (Netherlands) B.V."

should read:

Item:

-- (73) Assignee: Insituform (Netherlands) B.V.--

Signed and Sealed this

Fourth Day of December, 2007

JON W. DUDAS
*Director of the United States Patent and Trademark Office*